(No Model.)
E. DESOBRY.
DEVICE FOR PLOWS.
No. 372,364. Patented Nov. 1, 1887.
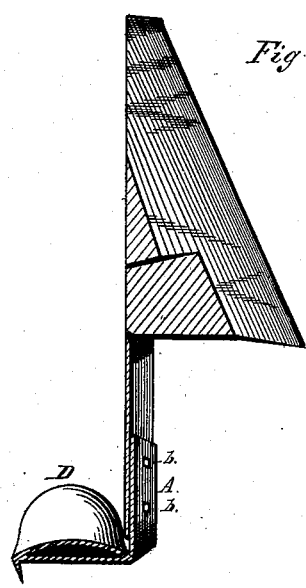
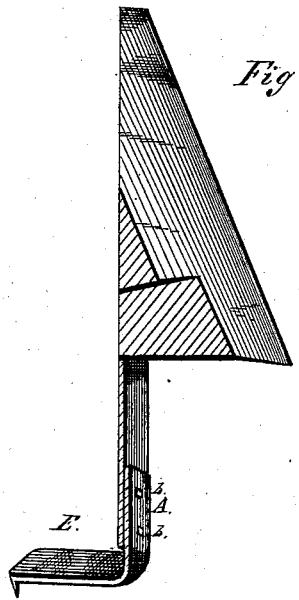
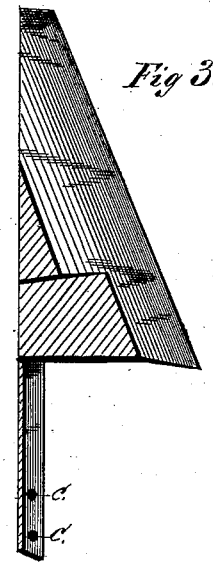
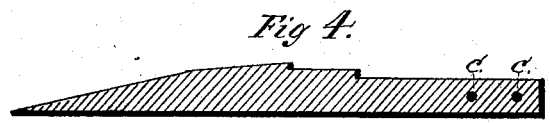
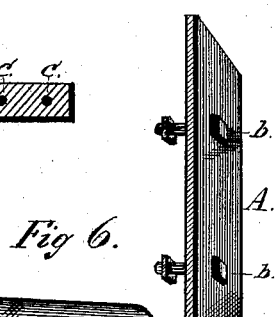
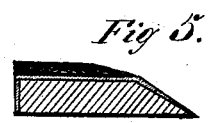
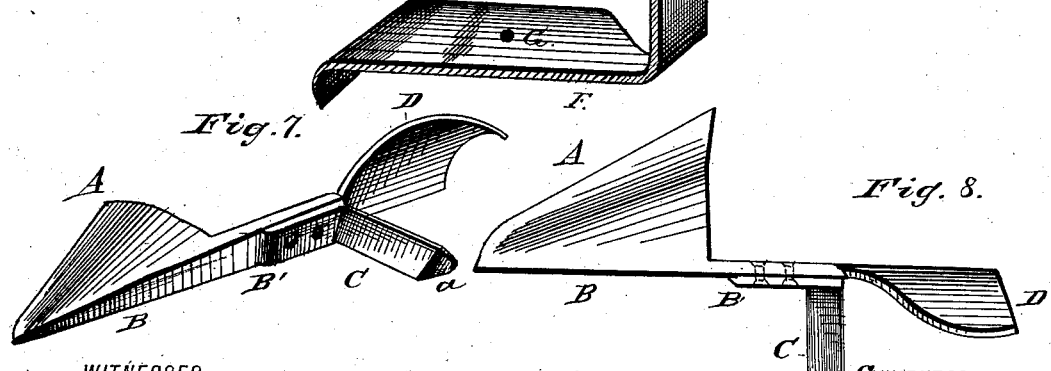
WITNESSES
Helmuth Holtz
G. J. Genewine
INVENTOR
Edward Desobry
By his Attorney
W. R. Stringfellow
N. PETERS, Photo-Lithographer, Washington, D. C.

UNITED STATES PATENT OFFICE.

EDWARD DESOBRY, OF PLAQUEMINE, LOUISIANA.

DEVICE FOR PLOWS.

SPECIFICATION forming part of Letters Patent No. 372,364, dated November 1, 1887.

Application filed April 14, 1887. Serial No. 234,857. (No model.)

*To all whom it may concern:*

Be it known that I, EDWARD DESOBRY, a citizen of the United States, residing at Plaquemine, in the parish of Iberville and State of Louisiana, have invented certain new and useful Improvements in Devices for Plows; and I do declare the following to be a full, clear, and exact description of the invention, such as will enable others skilled in the art to which it appertains to make and use the same.

This invention relates to plows and cultivators which are designed to run between rows of corn, cotton, and other plants, when laid out in rows, for the purpose of thinning out and at the same time loosening the soil between the rows and clearing out the weeds without injuring the plants.

My invention will be fully understood from the following description and claims, when taken in connection with the annexed drawings, in which—

Figure 1 is a top view of a triangular surface blade or weeder, showing a spoon-shaped thinning portion secured to the landside extension thereof. Fig. 2 is a similar view showing a different form of thinning-blade secured to the landside extension. Fig. 3 is a similar view without a thinning-blade. Figs. 4 and 5 are sectional details. Fig. 6 is a perspective view of one form of the thinning or weed-cutting blade and its bolts detached from the landside extension of the surface-plow. Fig. 7 is a perspective view showing the weed-cutting blade, the thinning-blade, its knife-edge guide, and a soil-turner or mold-board, and Fig. 8 is a top view of Fig. 7.

It is well known in the cultivation of young cotton, corn, and other crops that it is necessary to weed out between the plants, so that the main stalks shall be left in regular "check-rows" at even distances apart. To do this work effectually without the labor of hoeing is the object of my invention.

Referring to the annexed drawings by letter, A designates a well-known angular surface-weeder, which is provided with a landside, B, having an extension, B', posterior to its wing. This extension B' is perforated, and thus adapted to have rigidly secured to it an inclined blade, C, which is substantially at right angles to the said landside B B', the inclination of the blade being backward for the purpose of skimming the surface soil, cutting the roots of the weeds, and loosening the soil. At the landside end of said blade is formed a fin, *a*, which serves the twofold purpose of a guide and a shield. This fin is not long enough to cut the roots of the plants while thinning out, yet it serves in a great measure as a gage for directing the cultivation between the rows and in crossing the rows of plants. The blade C may be made spoon-shaped or any other suitable shape, and it may be formed with a shank and secured to the landside extension of the weeder A in any suitable manner.

I have above shown that I combine with a weeder, A, a thinning-blade having a fin, *a*, and described that the weeds and loose surface soil are lifted and discharged behind the blade C, the surface clods being pulverized and mixed with the weeds.

It will be observed by reference to Figs. 7 and 8 that I have also provided for turning over the loose weeds and soil, so that the weeds will be covered and allowed to rot. This I do by simply attaching, in any suitable manner, to the extension B' a mold-board which is curved in such manner and arranged in such relation to the blade C that the material cut and lifted by this blade will be turned over into the furrow between the plants which it is desired to leave standing.

Having described my invention, what I claim, and desire to secure by Letters Patent, is—

1. The combination of a weeding-blade, A, a scraping-blade, C, and a turning-blade, D, as described.

2. The combination, in a cultivator, of the weeding-blade A, having a landside extension, a scraper, C, having a fin on its outer extremity, and a mold-board, D, in rear thereof, substantially as described.

In testimony whereof I affix my signature in presence of two witnesses.

EDWARD DESOBRY.

Witnesses:
G. J. YENEWINE,
R. H. SAIDEN.